(12) United States Patent
Raghuvanshi et al.

(10) Patent No.: US 12,212,489 B2
(45) Date of Patent: Jan. 28, 2025

(54) SITUATION AWARE QOS AUTOMATION SYSTEM AND METHOD LEVERAGING USER DEVICE REAL TIME UPDATING

(71) Applicant: AT&T Mobility II LLC, Atlanta, GA (US)

(72) Inventors: Prashant Raghuvanshi, Parker, CO (US); Christopher San Gaspar, Alexandria, VA (US)

(73) Assignee: AT&T Mobility II LLC, Atlanta, GA (US)

( * ) Notice: Subject to any disclaimer, the term of this patent is extended or adjusted under 35 U.S.C. 154(b) by 93 days.

(21) Appl. No.: 18/045,714

(22) Filed: Oct. 11, 2022

(65) Prior Publication Data
US 2024/0121184 A1    Apr. 11, 2024

(51) Int. Cl.
*H04L 45/302* (2022.01)
*H04L 45/12* (2022.01)
*H04L 45/24* (2022.01)

(52) U.S. Cl.
CPC ........ *H04L 45/3065* (2013.01); *H04L 45/123* (2013.01); *H04L 45/24* (2013.01)

(58) Field of Classification Search
CPC ....... H04L 45/08; H04L 45/123; H04L 45/22; H04L 45/24; H04L 45/3065
See application file for complete search history.

(56) References Cited

U.S. PATENT DOCUMENTS

| | | | |
|---|---|---|---|
| 11,317,244 B1* | 4/2022 | Miretsky | H04W 24/08 |
| 2019/0215731 A1* | 7/2019 | Qiao | H04W 24/06 |
| 2019/0274178 A1* | 9/2019 | Salkintzis | H04W 28/0268 |
| 2022/0022029 A1* | 1/2022 | Di Girolamo | H04W 4/50 |
| 2022/0039181 A1* | 2/2022 | Kim | H04W 76/15 |
| 2022/0045917 A1* | 2/2022 | Uppili | H04W 24/08 |
| 2022/0210849 A1* | 6/2022 | Xu | H04W 28/0268 |
| 2023/0145512 A1* | 5/2023 | Park | H04L 67/142 709/227 |
| 2023/0164555 A1* | 5/2023 | Starsinic | H04W 8/205 455/411 |

(Continued)

OTHER PUBLICATIONS

"ETSI TS 123 503 V16.5.0 (Jul. 2020)", 3GPP 5G A Global Initiative, 5G Policy and charging control framework for the 5G System (5GS); Stage 2 (3GPP TS 23.503 version 16.5.0 Release 16), 2020, 120 pp.

(Continued)

*Primary Examiner* — Kostas J Katsikis
(74) *Attorney, Agent, or Firm* — Guntin & Gust, PLC; Douglas Schnabel

(57) ABSTRACT

Aspects of the subject disclosure may include, for example, obtaining, by a processing system including a processor, network data associated with a communication network; generating, by the processing system, Quality of Service (QoS) information by applying machine learning to the network data; and providing, by the processing system, the QoS information to a Policy Control Function (PCF) that selects or generates a first UE Route Selection Policy (URSP) rule according to the QoS information and provides the first URSP to an end user device, where the first URSP rule is implemented to provide a communication service to the end user device utilizing an application via the communication network. Other embodiments are disclosed.

20 Claims, 7 Drawing Sheets

(56) References Cited

U.S. PATENT DOCUMENTS

| | | | | |
|---|---|---|---|---|
| 2023/0308733 A1* | 9/2023 | Gangakhedkar | ... | H04N 21/2402 |
| 2023/0379764 A1* | 11/2023 | Zhu | ...................... | H04W 28/24 |
| 2023/0422117 A1* | 12/2023 | Li | ........................ | H04W 36/08 |
| 2024/0039854 A1* | 2/2024 | Vemuri | ................ | H04L 45/302 |

OTHER PUBLICATIONS

"ETSI TS 124 526 V16.5.0 (Oct. 2020)", 3PP 5G A Global Initiative, 5G; User Equipment (UE) policies for 5G System (5GS); Stage 3 (3GPP TS 24.526 version 16.5.0 Release 16), 2020, 56 pp.

* cited by examiner

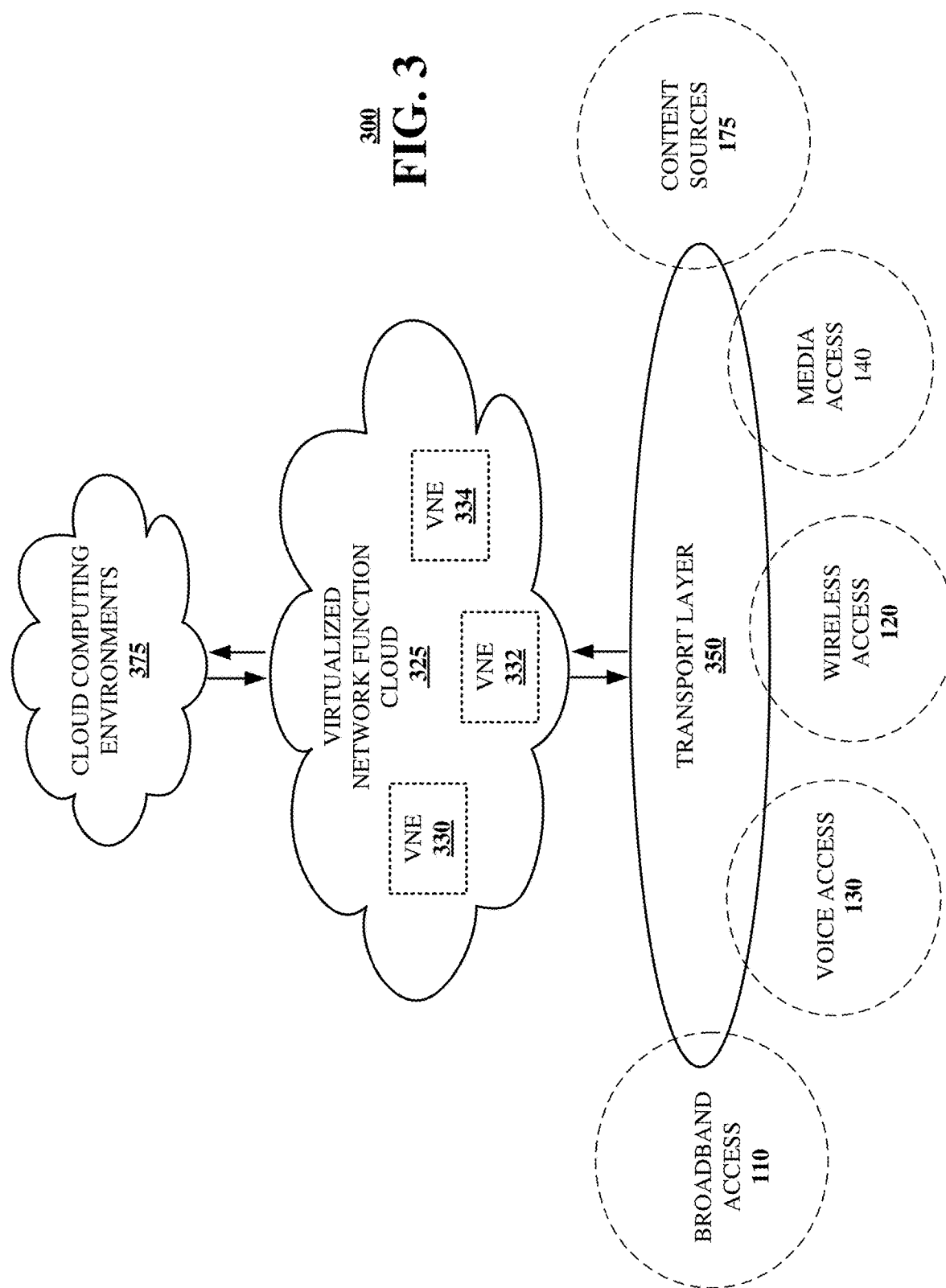

SITUATION AWARE QOS AUTOMATION SYSTEM AND METHOD LEVERAGING USER DEVICE REAL TIME UPDATING

FIELD OF THE DISCLOSURE

The subject disclosure relates to a situation aware Quality of Service (QoS) automation system and method leveraging user device real time updating.

BACKGROUND

To provide higher QoS, a network defines QoS rules statically in a policy server. A network provisions a static policy and the subscriber gets the higher QoS during the duration it is requested. Obtaining a QoS update relies on a manual action by a dispatcher who goes and selects an updated QoS policy for a particular duration.

In 5G networks, UE Route Selection Policy (URSP) can be used by end user devices to determine how to route uplink/downlink traffic for an application. Based on the type of subscription plan or service a customer purchased, they get throughput, priority and preemption in the network based on that static choice.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
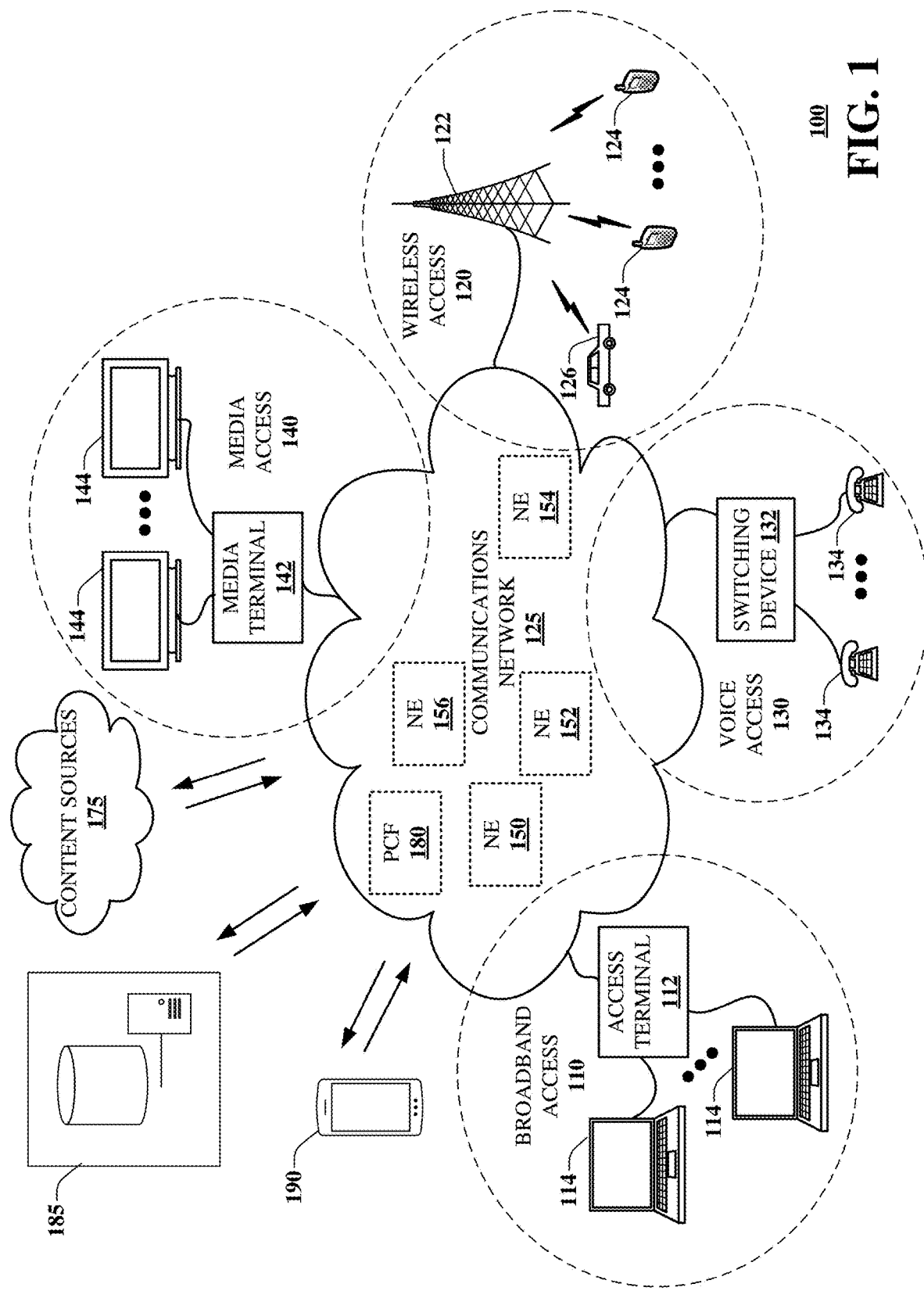
FIG. 1 is a block diagram illustrating an exemplary, non-limiting embodiment of a communications network in accordance with various aspects described herein.

The subject disclosure describes, among other things, illustrative embodiments for providing (e.g., automatically or selectively) an end user device with best user experience/QoS based on a particular situation, event and/or circumstances utilizing closed loop automation capabilities derived by Artificial Intelligence/Machine learning (AI/ML) driven rules that a network component, such as a Policy Control Function (PCF), implements by self-learning and implementing URSP rules based on inference of data inputs. In one or more embodiments, AI/ML inferences can evolve and can adapt to changes (including rapid changes) based on a continuous learning model. In one or more embodiments, a process is provided that can lead to a more predictive QoS policy which an end user device can utilize.

In one or more embodiments, a dynamic QoS policy implementation is provided which can be more efficient and result in a higher QoS as compared to a network defining QoS rules statically in a policy server. In one or more embodiments, a dynamic QoS policy implementation is not limited to a user (e.g., a first responder) wanting a higher QoS such that the network provisions a static policy and the subscriber gets the higher QoS during the duration it was requested. In one or more embodiments, a dynamic QoS policy implementation can provide a higher QoS just for during an incident/situation and/or during higher network congestion scenarios which can be automatic and self-learning.

In one or more embodiments, a dynamic QoS policy implementation can include facilitating dynamic QoS policy assignment(s) to an end user device or set of end user devices utilizing URSP policies that are implemented based on events and/or situational awareness. In one or more embodiments, these URSP rules can be implemented or provided by a PCF working in conjunction with a User Data Repository (UDR), where the PCF utilizes AI/ML driven policies based on inputs from one or more analytics engines/platforms.

In one or more embodiments, an Application Programming Interface (API) can be provided that can be leveraged by third party developers and vendor partners that can create their own dispatch and/or uplink/downlink applications which can interact with the dynamic QoS policy process. In one or more embodiments, the dynamic QoS policy process can be extended when newer technologies are introduced (e.g., 6G, 7G, NG) based on exposure to, or otherwise use of, open/standard API's. In one or more embodiments, the dynamic QoS policy process can be utilized with various Radio Access Technologies (RATs).

In one or more embodiments, the dynamic QoS policy process can be implemented on a network core (e.g., a 5G SA core) and/or can use 3GPP defined architecture elements. In one or more embodiments, the dynamic QoS policy process can provide real-time notification to the user(s) and/or supervisor(s) (e.g., incident commander) as to whether the QoS update to a higher level of QoS was successful or not. In one or more embodiments, the dynamic QoS policy process can provide an end user device with a capability to automatically get a QoS update, which increases efficiency as it does not require a manual action by a dispatcher who goes and selects an updated QoS policy for a particular duration. In one or more embodiments, the dynamic QoS policy process can provide improved QoS, such as based on user needs.

In one or more embodiments, the dynamic QoS policy process can utilize an analytics platform which can be continuously, frequently and/or periodically monitoring and collecting various information including network data, traffic conditions and/or situational data (e.g., end user device location, traffic patterns, first responders in the vicinity, sudden network congestion, etc.). In one or more embodiments, the dynamic QoS policy process, such as through use of the analytics platform or other devices/functionality, can provide predictive AI/ML-based recommendations to a PCF (or other device that provides QoS policies and rules). For instance, a request can be sent to a Network Exposure Function (NEF) which can send an API notification to the PCF to apply a particular policy which provides a higher or lower QoS (or adjustment to a QoS parameter(s)) to the end user device such as during the specified situation or event. In one embodiment, the PCF then sends this updated request towards the other packet core elements which send it to the end user device. In one embodiment, the end user device can have the ability to accept or deny the request (e.g., for particular types of QoS rules and may not have the ability to accept or deny the request for other types of QoS rules) and/or can enable auto-accept. In one embodiment, as a result, a QoS policy is updated automatically, for example, which can route the end user traffic to a different slice or a higher QoS Data Network Name (DNN).

In one or more embodiments, the dynamic QoS policy process can provide a capability where multiple end user devices can request and/or bid for a higher or lower QoS and/or can accept or deny it, such as based on the QoS KPI's that the network sends to the end user device. In one or more embodiments, the dynamic QoS policy process and its management can be offered to a host of end user devices and enterprise applications, as well as other smaller enterprises like smart factories, connected cars, health care industry, industrial IoT industry, critical infrastructure, venues, conferences, MEC, edge, and so forth. Other embodiments are described in the subject disclosure.

One or more aspects of the subject disclosure include a device, comprising: a processing system including a processor and operating as a PCF in a communication network; and a memory that stores executable instructions that, when executed by the processing system, facilitate performance of operations. The operations include receiving QoS information that is generated from machine learning applied to collected network data associated with a communication network. The operations include providing a first URSP rule to a first end user device, where the first URSP rule is selected or generated according to the QoS information. The operations include providing a second URSP rule to a second end user device, where the second URSP rule is selected or generated according to the QoS information, where the first and second URSP rules are implemented with respect to a same application that provides a first communication service to the first end user device and provides a second communication service to the second end user device, where the first and second URSP rules result in different QoS for each of the first and second communication services via the communication network.

One or more aspects of the subject disclosure include a non-transitory machine-readable medium, comprising executable instructions that, when executed by a processing system including a processor of an end user device, facilitate performance of operations. The operations include receiving a first URSP rule, where the first URSP rule is selected or generated by a PCF according to QoS information that is generated from machine learning applied to collected network data associated with a communication network. The operations include determining to agree to utilize the first URSP rule. The operations include providing a communication service utilizing an application via the communication network according to the first URSP rule.

One or more aspects of the subject disclosure include a method, comprising obtaining, by a processing system including a processor, network data associated with a communication network. The method includes generating, by the processing system, QoS information by applying machine learning to the network data. The method includes providing, by the processing system, the QoS information to a PCF that selects or generates a first URSP rule according to the QoS information and provides the first URSP to an end user device, where the first URSP rule is implemented to provide a communication service to the end user device utilizing an application via the communication network.

Referring now to FIG. 1, a block diagram is shown illustrating an example, non-limiting embodiment of a system 100 in accordance with various aspects described herein. System 100 can generate and provide QoS information, such as generated from machine learning applied to various data including collected network data associated with a communication network; provide URSP rule(s) to end user device(s) (e.g., mobile phones, tablets, laptop computers, IoT devices, vehicle communication systems, or other communication devices) where the URSP rule(s) are selected or generated based in whole or in part on the QoS information; and implement or otherwise enforce the URSP rule(s) to provide communication service(s) to the end user device(s). System 100 can select or generate the URSP rule(s) to provide a same or different QoS for the communication services even where the communication services are associated with a same or different applications of the end user device(s). In one or more embodiments, other types of rules can be utilized in addition to or in place of URSP rules, where these other types of rules facilitate controlling QoS for an application of an end user device providing a communication service to the end user device, including rules that define or provide information mapping certain user data traffic (e.g., applications and/or uplink traffic) to session connectivity parameters (e.g., PDU session connectivity parameters).

In one embodiment, one or more of the URSP rules can be generated in response to a particular network device (e.g., PCF 180) receiving QoS information. In one embodiment, one or more of the URSP rules can be selected or generated or otherwise can be based on a location of the end user device(s) 190. In one embodiment, the URSP rule(s) can be selected or generated or otherwise be based on detecting or determining an event occurring within a particular distance (e.g., a threshold) of the location of the end user device(s) 190. Other factors can be utilized for selecting or generating the one or more URSP rules, such as device identification (e.g., first responder device), user identification (e.g., first responder), type of service (e.g., voice/video call or data session), and so forth. In one or more embodiments, one or more of the URSP rules can be for a single end user device 190 or for a group of end user devices (e.g., end user devices that are utilizing a same application or service, end user devices that are associated with a particular entity (e.g., a business or government entity), end user devices in or near a particular location (e.g., near or predicted to be going near an emergency event), end user devices obtaining a communication service during a particular time period, or other groupings or categorizing of end user devices).

In one embodiment, the URSP rule(s) can designate a particular network slice(s) and/or a particular DNN to be utilized. In one embodiment, implementing the URSP rule(s) and utilizing the particular network slice(s) and/or the particular DNN can result in a change to the QoS for the communication service(s). In one embodiment, the QoS change can be based on various parameters including latency, bandwidth, and so forth. In one embodiment, the URSP rule(s) can be generated after the communication service(s) has begun and can result in a change of the QoS for the end user device(s) 190 during the communication service(s). In one embodiment, one or more of the URSP rule(s) can be implemented or otherwise enforced after (and in response to) the end user device(s) 190 agreeing to utilize the URSP rule(s). In one embodiment, the end user device(s) 190 can be authorized to agree or reject certain types of URSP rule(s), such as URSP rules that increase QoS, but may not be permitted to reject other types of URSP rule(s), such as URSP rules that decrease QoS (e.g., to increase resources for use by first responder devices in the same area as the particular device).

In one embodiment, the QoS information can be obtained via a Network Exposure Function (NEF) that is in communication with an Application Programming Interface (API) gateway, where the URSP rule(s) are provided by the PCF 180 to the user device 190 via an Access and Mobility Management Function (AMF). In one embodiment, the QoS information can be generated from machine learning based at least in part on data that is obtained by an analytics platform 185. The platform(s) 185 can be operated by a same or different entity that operates the communications network 125.

In one embodiment, one or more of the URSP rules can designate an operational parameter(s) of the end user device(s) 190 that are to be adjusted by the end user device(s) (e.g., power, channel, etc.) that results in a change to the QoS for the communication service(s). In one embodiment, one or more of the URSP rules can designate an operational parameter(s) of the network that are to be adjusted by the network (e.g., network slice(s), DNN, bandwidth, channel, signal strength, etc.) that results in a change to the QoS for the communication service(s).

One or more of the exemplary embodiments can operate in accordance with and/or utilize one or more functions and/or components described in 3GPP TS 23.503 and 3GPP TS 24.526 standards, the disclosure of which is hereby incorporated by reference herein. One or more of the exemplary embodiments can operate as part of, or in conjunction with, any network including 5G, 6G, NG networks, which may or may not utilize a PCF to deliver URSP rules to user devices, but which may utilize policy rules (e.g., for control plane functions) to facilitate providing communication services (which can include uplink communication), including providing network slicing, roaming, and/or mobility management. One or more of the exemplary embodiments can operate as part of, or in conjunction with, any network that employs QoS-related rules, which may or may not be called URSP rules, but which may support, control, enable, enforce and/or facilitate QoS policy for communication services over the network.

In one or more embodiments, system 100 facilitates providing policy information from the PCF 180 to the end user device 190, which can include Access Network Discovery & Selection Policy (ANDSP) that can be used by the end user device for selecting non-3GPP accesses network and which includes URSP that can be used by the end user device to determine how to route outgoing traffic. In one or more embodiments, system 100 facilitates traffic being routed to an established PDU Session, offloaded to non-3GPP access outside a PDU Session, or triggering the establishment of a new PDU Session.

In one or more embodiments, a URSP rule can include a precedence value of the URSP rule identifying the precedence of the URSP rule among all the existing URSP rules; a traffic descriptor; and one or more route selection descriptors. In one or more embodiments, the traffic descriptor can include either a match-all traffic descriptor; or one or more of the following: one or more application identifiers; one or more IP 3 tuples as defined in 3GPP TS 23.503 (i.e., the destination IP address, the destination port number, and the protocol in use above the IP); one or more non-IP descriptors (i.e., destination information of non-IP traffic); one or more DNNs; one or more connection capabilities; and one or more domain descriptors (i.e., destination FQDN(s) or a regular expression as a domain name matching criteria).

In one or more embodiments, each route selection descriptor can include a precedence value of the route selection descriptor and either: one PDU session type and, optionally, one or more of the following: SSC mode; one or more S-NSSAIs; one or more DNNs; Void; preferred access type; multi-access preference; a time window; and location criteria; or non-seamless non-3GPP offload indication. As an example, an SSC Mode Selection Policy (SSCMSP) can be used by the end user device to associate the matching application with SSC modes. As an example, a Network Slice Selection Policy (NSSP) can be used by the end user device to associate the matching application with SNSSAI. As an example, a DNN Selection Policy can be used by the end user device to associate the matching application with DNN. As an example, a PDU Session Type Policy can be used by the end user device to associate the matching application with a PDU Session Type. As an example, a Non-Seamless Offload Policy can be used by the end user device to determine that the matching application should be non-seamlessly offloaded to non-3GPP access (i.e. outside of a PDU Session). As an example, an Access Type preference can be used such that if the end user device needs to establish a PDU Session for the matching application, this indicates the preferred Access Type (3GPP or non-3GPP or Multi-Access). Other formats can be utilized for the QoS rules (e.g., URSP rules) which may or may not include some or all of the field described herein and which may or may not include other or additional fields.

In one or more embodiments, system 100 enables the end user device 190 to evaluate the URSP rule(s) in the order of Rule Precedence, such as for every newly detected application. The end user device 190 can determine if the application is matching the Traffic descriptor of any URSP rule. For example, when a URSP rule is determined to be applicable for a given application, the end user device 190 selects a Route Selection Descriptor within this URSP rule in the order of the Route Selection Descriptor Precedence. For example, when a valid Route Selection Descriptor is found, the end user device 190 determines if there is an existing PDU Session that matches all components in the selected Route Selection Descriptor.

In one embodiment, if the end user device 190 determines that there is more than one existing PDU Session which matches, then the end user device 190 selects one of them to use. In one embodiment, if none of the existing PDU Sessions matches, the end user device 190 can try to establish a new PDU Session using the values specified by the selected Route Selection Descriptor. In one embodiment, if a PDU Session Establishment Request is rejected, then the end user device 190 can select another combination of values in the currently selected Route Selection Descriptor if any other value for the rejected component in the same Route Selection Description can be used; otherwise, the end user device 190 selects the next Route Selection Descriptor, which contains a combination of component value which is not rejected by network, in the order of the Route Selection Descriptor Precedence, if any. In one embodiment, if the end user device 190 fails to establish a PDU session with any of the Route Selection Descriptors, it tries other URSP rules in the order of Rule Precedence with matching Traffic descriptors, except the URSP rule with the "match-all" Traffic descriptor, if any.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
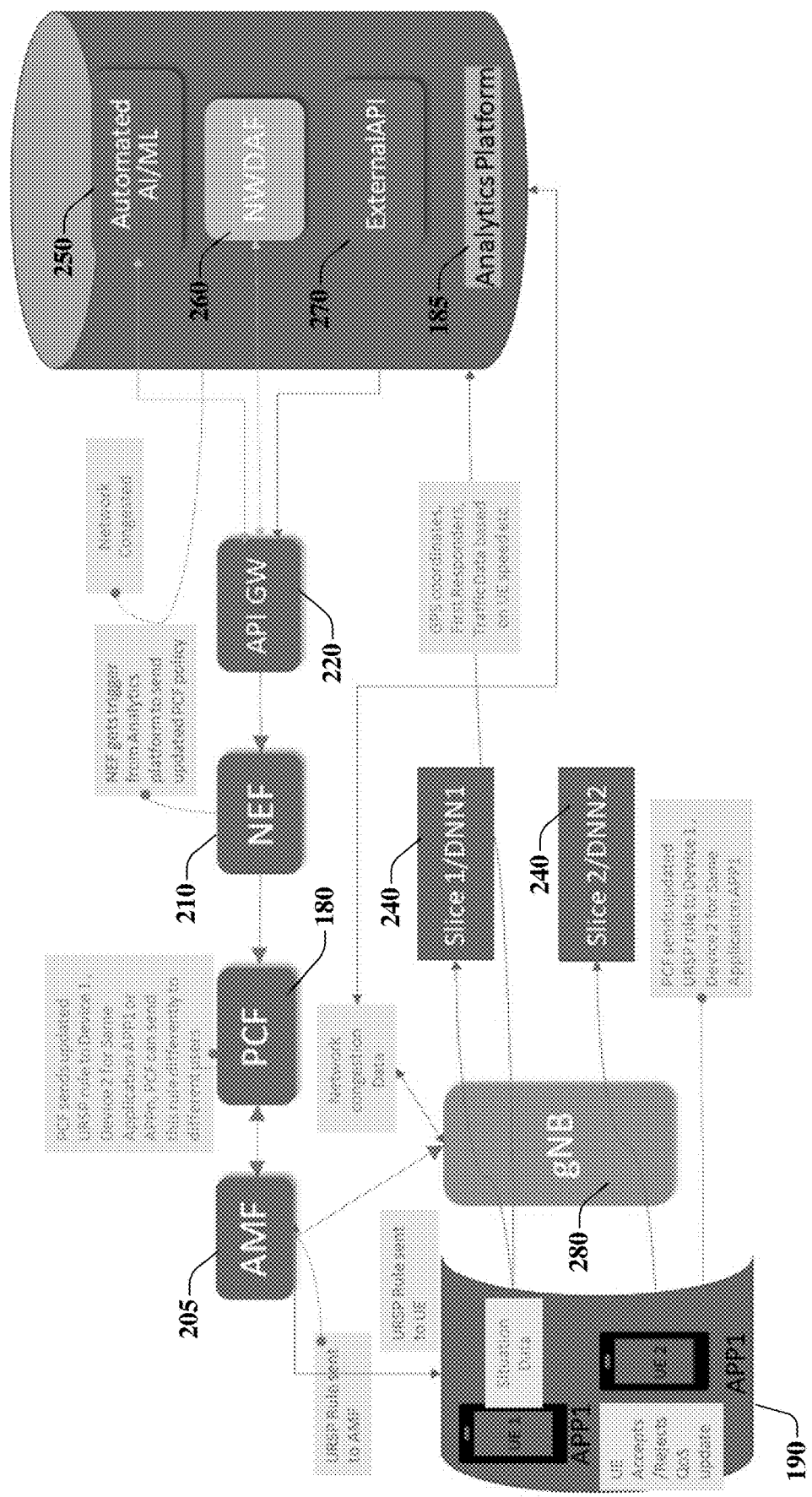
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In one embodiment, one or more end user devices 190 can receive URSP rule(s) (e.g., via AMF 205) that are selected or generated by the PCF 180 according to QoS information received from NEF 210 and/or API gateway 220. As an example, the QoS information can be generated in whole or in part from machine learning applied to various information, including collected network data associated with a communication network. In one embodiment, the collected network data can include network performance parameters that can be mapped to locations, types of services, types of traffic, and so forth. Various techniques and components, which can be performed or managed by various entities including the network provider, the application developer, and/or other entities, can be utilized for generating or otherwise providing the QoS information, such as employing device(s)/ functionality 250 that executes AI/ML, employing Network Data Analytics Function (NWDAF) 260 that can manage or facilitate production and/or consumption of core network data; employing external APIs 270 for interaction with third parties including software developers, and/or employing analytics platform(s) 185 for analyzing, generating, and/or collecting network information, end user device information, or other data that can be considered in determining QoS policies.

In one or more embodiments, the end user devices 190 can agree to or reject utilizing one, some, or all the received URSP rules. System 200 can provide the communication service utilizing the application via the communication network according to the URSP rule(s), which can include designating particular network slice(s) and/or DNN 240. System 200 can include other components to facilitate providing the communication service including gNB 280.

In one or more embodiments, the determining to agree to utilize the URSP rule(s) can result in a charge being applied to a subscriber account associated with the end user device 190. In one or more embodiments, the end user device 190 can present an option at a user interface (UI) of the end user device to accept or reject a QoS level that corresponds to the URSP rule; and can receive user input in response to the option, where the determining to agree to utilize the URSP rule is based on the user input.

In one or more embodiments, the providing the communication service according to the URSP rule includes use of a particular network slice(s) 240 designated by the URSP rule. In one or more embodiments, the providing the communication service according to the URSP rule includes use of a particular DNN 240 designated by the URSP rule. In one or more embodiments, the end user device 190 can receive a second URSP rule(s), where the second URSP rule(s) is selected or generated by the PCF 180 during the communication service; and can continue the providing the communication service utilizing the second URSP rule(s), where the second URSP rule(s) may be implemented with or without an agreement at the end user device to utilize the second URSP rule(s).

In one or more embodiments, one or more of the URSP rules can be generated after the communication service has begun and can result in a change of the QoS for the end user device 190 during the communication service. In one or more embodiments, one or more of the URSP rules can be generated by the PCF 180 in response to the PCF receiving the QoS information from the NEF 210. In one or more embodiments, one or more of the URSP rules can be based in part on a location of the end user device 190, an identification of the end user device, an identification of a user of the end user device, a determination of an emergency event within a distance of the end user device, or a combination thereof. In one or more embodiments, one or more of the URSP rules can be based in part on predictions in the QoS information and/or QoS information that is generated based on predictions (e.g., predictions made by the AI/ML) including a predicted future location of the end user device 190, a determination of a predicted future event within a distance of the end user device, a predicted future use of a particular communication service, a predicted future use of a particular application, a predicted future use of a particular application, or a combination thereof. As described herein the predictions can be made or otherwise determined, such as by the AI/ML, based on various information, including historical information, such as historical behavior or consumption patterns associated with a device, a user, and so forth.

System 200 facilitates QoS being the basis of providing differentiated user experience for devices connecting to a network (e.g., a mobile device connecting to a wireless network). In one or more embodiments, system 200 facilitates providing QoS for different applications, different types of applications, and/or different user traffic on a network (e.g., a wireless network such as 5G/LTE) utilizing a dynamic QoS policy process that is more efficient than pre-defining a set of QoS rules in a policy. In one or more embodiments, system 200 facilitates providing a higher QoS in case of a particular incident (e.g., wildfire or active law enforcement pursuit event), which can support the higher QoS, including limited to only for the duration of the incident and not statically all the time. It should be understood that one or more of the exemplary embodiments can provide the adjusted QoS for different durations with respect to a particular event, such as time periods before, during and/or after the event.

In one or more embodiments, system 200 facilitates providing end user devices 190 with the ability (e.g., automatically and/or selectively) to upgrade or downgrade QoS based on various factors that can include situational awareness. As an example, if a police officer needs a higher QoS during extreme congestion, system 200 can predict or otherwise determine that need and can allow for automatically updating the QoS, such as based on URSP policies.

In one or more embodiments, system 200 facilitates multiple devices (e.g., end user devices 190) submitting a QoS upgrade or downgrade request and/or facilitates negotiating/approving a best available QoS policy which is available in the network and which is driven by URSP policies. In one or more embodiments, system 200 can include the PCF 180 implementing intelligent data driven AI/ML URSP policies that are based on situational awareness considering events such as emergency, earthquake, fire, sporting event, venue, highway drive, congested traffic route/pattern, vicinity of public safety users, sudden increase in congestion in the network, reduction of congestion in the network, or other factors.

In one or more embodiments, system 200 can enhance URSP capability and can allow end user devices to accept or reject an updated QoS rule. In one or more embodiments, system 200 can dynamically provide higher QoS for a particular time duration when there is a public safety incident or a situation/event rather than providing the higher QoS all the time based on static policy.

In one or more embodiments, system 200 can provide for a creation of an ecosystem to support dynamic QoS for various situations such as associated with particular venues, industrial IoT, connected cars, low latency applications, and so forth. In one or more embodiments, system 200 can enable dynamic QoS only during times of need, rather than paying a higher rate for the whole month or for a higher rate plan.

In one or more embodiments, system 200 can provide for notification to the user or requestor of the higher/lower QoS whether they are receiving this higher/lower QoS/value or not, as well as notification as to when this higher/lower QoS will end so that the user can either choose to extend the duration or let it expire. In one embodiment, a UI of the end user device 190 can provide an option for extending the higher or lower QoS, such as when the termination time is approaching (e.g., within a 5 minute threshold).

In one or more embodiments, system 200 can provide for effective notification in case the request for higher or lower QoS was denied such as due to network congestion/conditions so that it gives positive user experience and provides the capability for the requester to retry, rather than the requestor assuming they are operating on the higher or lower QoS.

In one or more embodiments, system 200 can perform dynamic QoS updates following 3GPP standard API's and can allow for extending this capability to future expansion of network technologies from LTE to 5G and future 3GPP technology generations.

In one or more embodiments, the end user device 190 can reject (with or without user input) utilizing one, some, or all the received URSP rules based on factors associated with the end user device, such as rejecting a QoS upgrade where the end user device has limited battery power left or rejecting a QoS upgrade where there is a charge for the upgrade and a user preference of the end user device indicates not to incur additional charges.

Figure 2B:
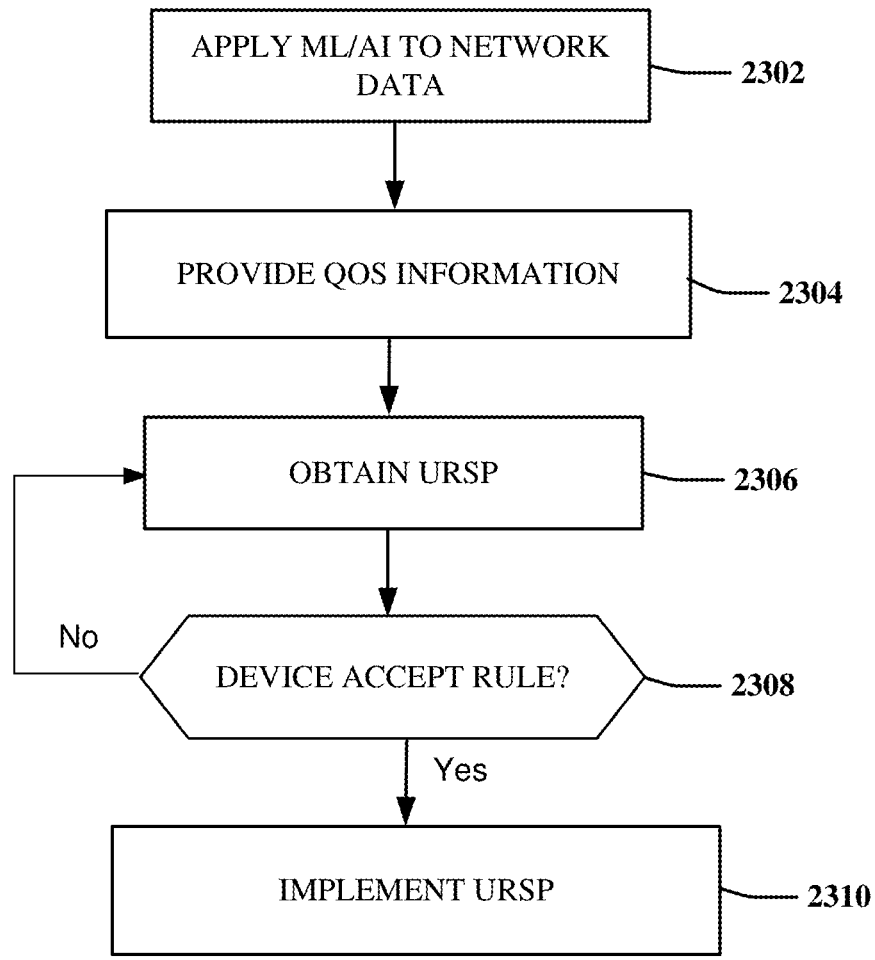
FIG. 2B depicts an illustrative embodiment of a method in accordance with various aspects described herein.

FIG. 2B depicts an illustrative embodiment of a method 230 in accordance with various aspects described herein. Method 230 can be performed or facilitated in whole or in part by one or more devices, including end user devices, network devices, third party devices, and so forth. At 2302, machine learning can be applied to various information to obtain QoS information. The machine learning can be of various types including supervised, unsupervised, federated, and so forth. As an example, the machine learning can be applied to collected network data associated with a communication network. As another example, the machine learning can be applied to information associated with the type or particular end user device(s), the type or particular communication service, the type or particular application being executed, the type or particular geographic location, or other information (which can include historic information, third party information, and so forth) that facilitates selecting or generating QoS policies or rules for an end user device or group of end user devices.

In one embodiment, an identification of a user, a location of the end user device, and a location of an emergency event/situation can be used to generate the QoS information (which can result in a QoS upgrade as described herein), such as determining that the user is a first responder that often uses this device during emergency situations and is currently near (or predicted to be going near) an emergency event. In another embodiment, an identification of a user as not being a first responder, a location of the end user device, and a location of an emergency event/situation can be used to generate the QoS information which can result in a downgrade of QoS for that particular end user device to free up resources for first responder devices near the emergency event.

In one embodiment, the QoS information can be particular to a parameter, such as applying machine learning to network data to determine or predict that one or more devices (which may have already been identified as part of the machine learning or may be unidentified but predicted to be utilizing a particular service) will require a latency guarantee of a particular amount for an Augmented Reality (AR) service being provided during a particular time period in a particular area. This example specifies a single parameter for a particular service, time period, and location, however, the QoS information can be more than one parameter and may or may not specify each of the particular service, the time period, and/or the location. Other parameters can also be indicated in the QoS information such as limits or guarantees with respect to packet loss, bit rate, throughput, transmission delay, availability, jitter, and so forth.

In one embodiment, the QoS information can be generated based on various information obtained from various sources, including an analytics platform(s) operated by the network service provider, an analytics platform(s) operated by one or more third parties, other entities or systems that collect information regarding end user devices/users (e.g., ecommerce websites, social network platforms, etc.), APIs from software developers (which may or may not correspond to the application that a particular end user device is executing for a communication service), and/or NWDAF or other functions/components that manage or facilitate producing and/or consuming network data (e.g., core network data). In one or more embodiments, various components/functionality can be utilized by method 230 to facilitate collection and distribution of data that is utilized for generating QoS information via machine learning, such as API gateway, NEF, AMF, external APIs, and so forth.

At 2304, the QoS information can be provided to a component/function in a format that allows for selecting or generating a QoS policy or rule, such as a URSP rule. For example, the QoS information can be provided to an NEF which can communicate with a PCF for selecting or generating the appropriate QoS policy or rule, such as a URSP rule at 2306.

At 2308, the user device can be provided with the opportunity (e.g., in some scenarios) to accept or reject the URSP rule. In one embodiment, a user interface (e.g., a pop-up window) can indicate the availability of a QoS associated with the URSP rule. For instance, the user can be provided with an option to upgrade the communication service. The option may or may not describe the particular URSP rule that would be implemented such as specifically describing a latency guarantee that would be enforced or generally describing a higher quality of service or service upgrade.

In one or more embodiments, the option and/or the particular URSP rule can include a duration or other limitation(s), such as a particular time period of use, a duration of the service (e.g., until the streaming of a video is concluded), only while the end user device is in a particular geographic area, only while a particular event is occurring, and/or some other criteria that can trigger removal/withdrawal/replacement of the URSP rule and result in a change of QoS. In one or more embodiments, the option and/or the particular URSP rule can be associated with a charge, billing or other incentive/reward technique. For example, the implementation of the particular URSP rule can result in an increase of QoS for the communication service and the subscriber's account is charged for the upgrade (e.g., one-time charge, hourly/minute-based charge, monthly charge, etc.).

In one or more embodiments, charge, billing or other incentive/reward technique triggered by the end user device accepting the option and/or use of the particular URSP rule can be described in a UI option presented to the user. In one embodiment, user/device preferences can be stored to accept or reject the option and/or use of the particular URSP rule, which can be universal or can be selective, such as pre-authorizing accepting the option and/or use of the particular URSP rule for all services associated with a particular application(s) or for only particular types of services.

In one or more embodiments, the option and/or the particular URSP rule can be associated with incentive/reward techniques such as an acceptance of a lower QoS during peak congestion is rewarded by a higher QoS during non-peak times. Other incentive/reward techniques can be used including free services, crypto-currency, and so forth for agreeing to a reduced QoS, such as when the network is trying to reduce congestion or free up resources.

At 2310, the URSP rule can be implemented. The implementation of the QoS rule, such as a URSP rule, can result in a particular QoS being delivered to the end user device for the communication service of the particular application. As described herein, the QoS rule, such as a URSP rule, can be or otherwise include a designation of one or more network slices, a designation of a DNN, a designation of one or more other network parameters, a designation of one or more end user device operational parameters, or other QoS rules that affect QoS for the communication service.

In one or more embodiments, the PCF or other device that receives the QoS information can generate the URSP rule(s) in real-time or otherwise responsive to receiving the QoS information, which can include creating a URSP rule (which did not already exist at the PCF) that satisfies conditions, requirements or other parameters reflected in or described by the QoS information that has been received.

In one or more embodiments, the QoS information can be utilized with respect to a same application that provides communication services to multiple end user devices, where some of the devices receive URSP rule(s) resulting in a same QoS for that same application while other devices receive different URSP rule(s) that result in different QoS for each of the devices for that same application.

One or more of the exemplary embodiments can provide required or desired QoS capabilities to multiple industries including public safety, manufacturing, industrial IoT, connected car, government agencies, and communication/telecom service providers who could offer this service to their customers.

In one or more embodiments, other devices can agree to and/or request a QoS upgrade for the particular device(s), such as an incident commander device agreeing or otherwise requesting QoS upgrade for first responder device(s) during an emergency event, In one or more embodiments, URSP rules can be selected or generated based on satisfying a particular KPI or parameter, such as providing latency limited to ten milliseconds. In this example, the ML/AI can determine or predict that one or more end user devices utilizing a particular service and/or a particular application would need a ten millisecond latency guarantee for achieving a desired User Experience.

In one or more embodiments, the ML/AI can be operated or otherwise managed in the cloud. In one or more embodiments, the NEF or other devices can operate as gateways for authentication and security with respect to devices or functionality outside of the network or outside of the network core. In one or more embodiments, the API gateway can be utilized to translate between different encoding to facilitate communication with the PCF. In one or more embodiments, the URSP rule can include other fields or other types of traffic/route descriptors and/or may not be limited to only those described in the 3GPP standard.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B and 3. For example, virtualized communication network 300 can facilitate in whole or in part generating and providing QoS information, such as generated from machine learning applied to various data including collected network data associated with a communication network; providing URSP rule(s) to end user device(s) where the URSP rule(s) are selected or generated based in whole or in part on the QoS information; and implementing or otherwise enforcing the URSP rule(s) to provide communication services to the end user device(s). The selection and/or generation of the URSP rule(s) can result in a same or different QoS for the communication services even where the communication services are associated with a same or different applications of the end user device(s).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
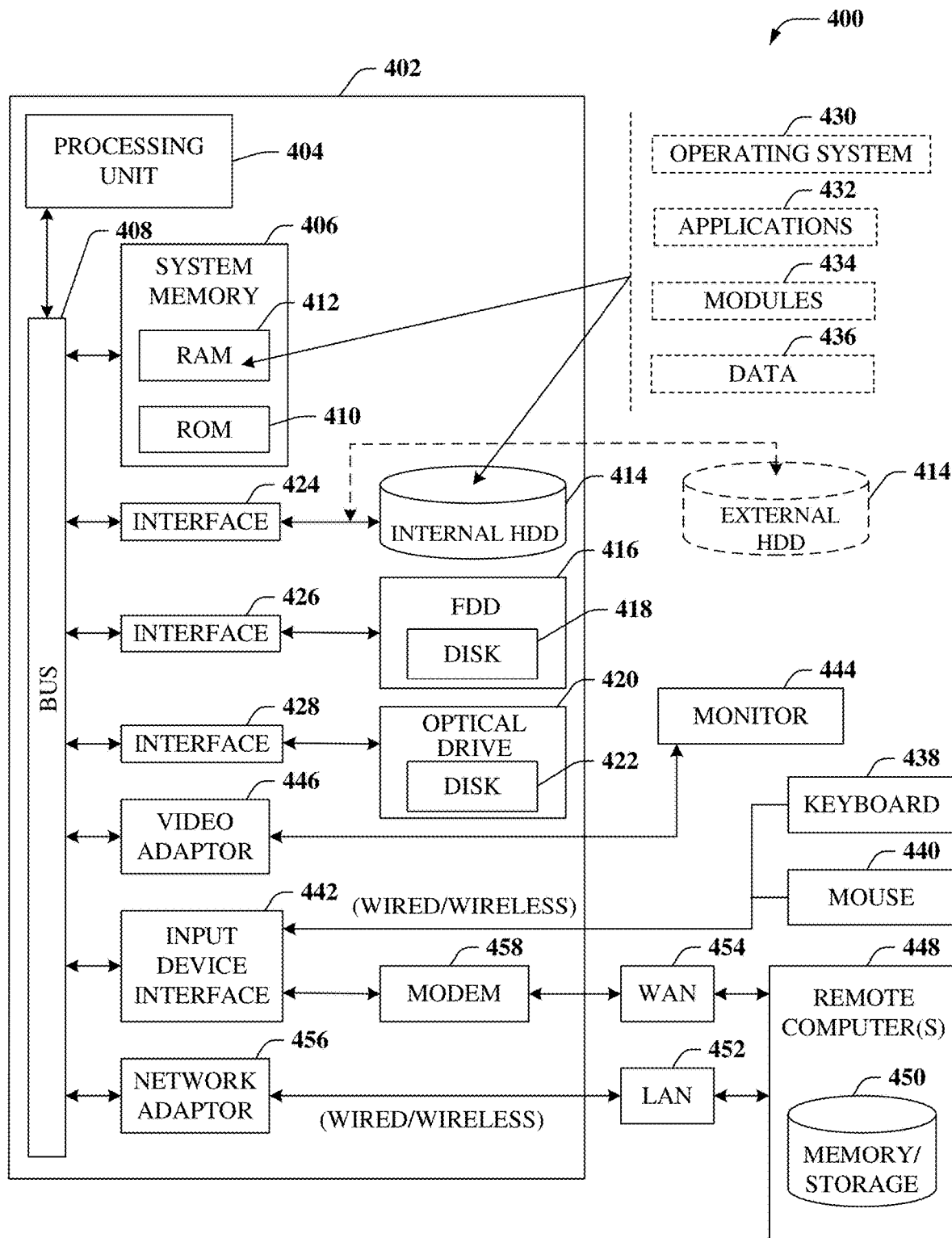
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part generating and providing QoS information, such as generated from machine learning applied to various data including collected network data associated with a communication network; providing URSP rule(s) to end user device(s) where the URSP rule(s) are selected or generated based in whole or in part on the QoS information; and implementing or otherwise enforcing the URSP rule(s) to provide communication services to the end user device(s). The selection and/or generation of the URSP rule(s) can result in a same or different QoS for the communication services even where the communication services are associated with a same or different applications of the end user device(s).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
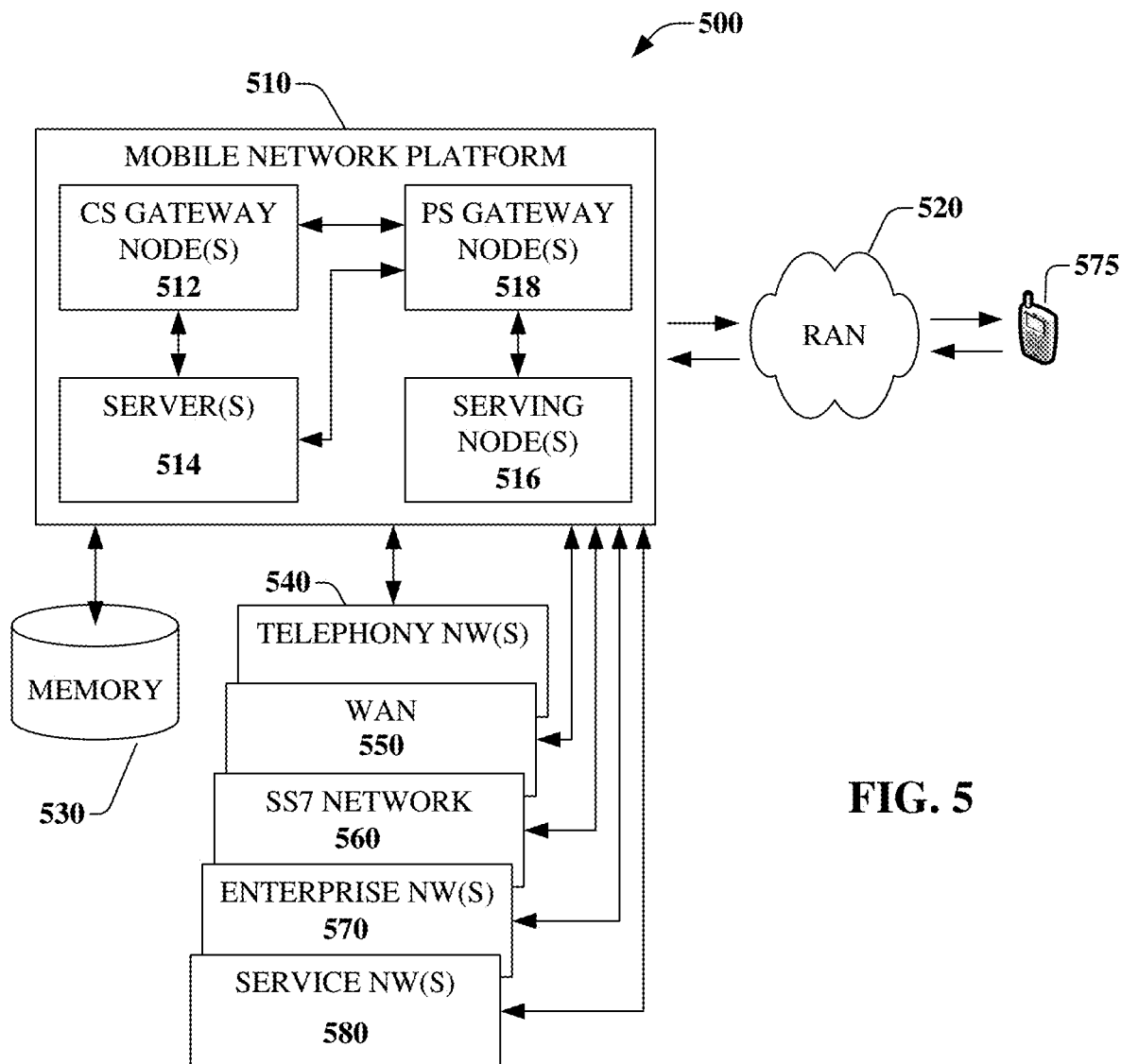
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part generating and providing QoS information, such as generated from machine learning applied to various data including collected network data associated with a communication network; providing URSP rule(s) to end user device(s) where the URSP rule(s) are selected or generated based in whole or in part on the QoS information; and implementing or otherwise enforcing the URSP rule(s) to provide communication services to the end user device(s). The selection and/or generation of the URSP rule(s) can result in a same or different QoS for the communication services even where the communication services are associated with a same or different applications of the end user device(s).

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
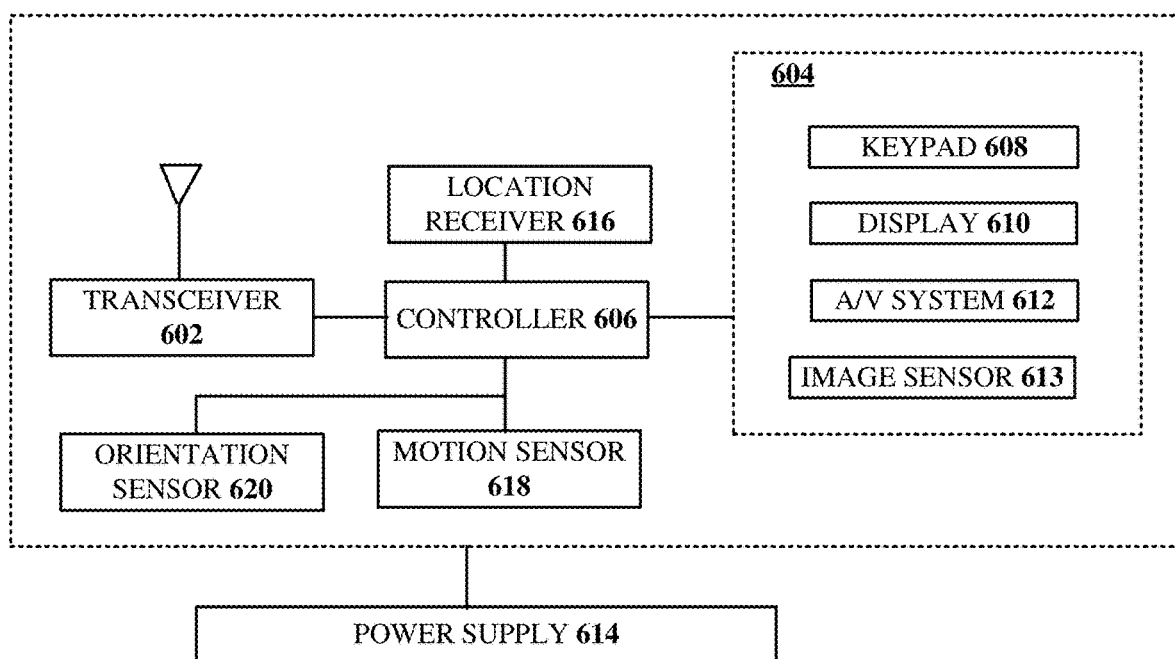
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part generating and providing QoS information, such as generated from machine learning applied to various data including collected network data associated with a communication network; providing URSP rule(s) to end user device(s) where the URSP rule(s) are selected or generated based in whole or in part on the QoS information; and implementing or otherwise enforcing the URSP rule(s) to provide communication services to the end user device(s). The selection and/or generation of the URSP rule(s) can result in a same or different QoS for the communication services even where the communication services are associated with a same or different applications of the end user device(s).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor and operating as a Policy Control Function (PCF) in a communication network; and
a memory that stores executable instructions that, when executed by the processing system, facilitate performance of operations, the operations comprising:
receiving Quality of Service (QOS) information that is generated from machine learning applied to collected network data associated with a communication network;
providing a first UE Route Selection Policy (URSP) rule to a first end user device, wherein the first URSP rule is selected or generated according to the QoS information; and
providing a second URSP rule to a second end user device, wherein the second URSP rule is selected or generated according to the QoS information, wherein the first and second URSP rules are implemented with respect to a same application that provides a first communication service to the first end user device and provides a second communication service to the second end user device;
determining whether the first end user device accepts the first URSP rule and whether the second end user device accepts the second URSP rule, wherein the first end user device is not permitted to reject the first URSP rule if the first URSP rule increases resources of the communication network available for use by a first responder device;
responsive to the determining that the first end user device has accepted the first URSP rule, facilitating a first QoS to the first end user device via the communication network;
responsive to the determining that the second end user device has accepted the second URSP rule, facilitating a second QoS to the second end user device via the communication network, wherein the first QoS and the second QoS are different values for each of the first and second communication services.

2. The device of claim 1, wherein the first URSP rule is generated in response to the receiving of the QoS information, and wherein the first URSP rule is based in part on a location of the first end user device.

3. The device of claim 2, wherein the first URSP rule is based in part on detecting an event occurring within a particular distance of the location of the first end user device.

4. The device of claim 1, wherein the first URSP rule designates a particular network slice or a particular Data Network Name (DNN) that results in a change to the QoS for the first communication service.

5. The device of claim 1, wherein the first URSP rule is generated after the first communication service has begun and results in of the facilitating the first QoS for the first end user device during the first communication service.

6. The device of claim 1, wherein the first URSP rule is implemented after the first end user device agrees to utilize the first URSP rule.

7. The device of claim 1, wherein the receiving of the QoS information is via a Network Exposure Function (NEF) that is in communication with an Application Programming Interface (API) gateway, wherein the providing of the first and second URSP rules is via an Access and Mobility Management Function (AMF).

8. The device of claim 7, wherein the QoS information that is generated from the machine learning is based in part on data that is obtained by an analytics platform operated by a first entity that is distinct from a second entity operating the communications network.

9. The device of claim 1, wherein the first URSP rule designates an operational parameter of the first end user device that is to be adjusted by the first end user device that results in to the facilitating the first QoS for the first communication service.

10. A non-transitory machine-readable medium, comprising executable instructions that, when executed by a processing system including a processor of an end user device, facilitate performance of operations, the operations comprising:
receiving a first UE Route Selection Policy (URSP) rule, wherein the first URSP rule is selected or generated by a Policy Control Function (PCF) according to Quality of Service (QoS) information that is generated from machine learning applied to collected network data associated with a communication network;
determining to agree to utilize the first URSP rule, wherein the end user device is not permitted to reject the first URSP rule if the first URSP rule increases resources of the communication network available for use by a first responder device; and
responsive to determining to agree to utilize the first URSP rule, receiving a communication service utilizing an application via the communication network according to the first URSP rule.

11. The non-transitory machine-readable medium of claim 10, wherein the determining to agree to utilize the first URSP rule results in a charge being applied to a subscriber account associated with the end user device.

12. The non-transitory machine-readable medium of claim 10, wherein the operations comprise:
presenting an option at a user interface of the end user device to accept or reject a QoS level that corresponds to the first URSP rule; and receiving user input in response to the option, wherein the determining to agree to utilize the first URSP rule is based on the user input.

13. The non-transitory machine-readable medium of claim 10, wherein the receiving the communication service according to the first URSP rule includes use of a particular network slice designated by the first URSP rule.

14. The non-transitory machine-readable medium of claim 10, wherein the receiving the communication service according to the first URSP rule includes use of a particular Data Network Name (DNN) designated by the first URSP rule.

15. The non-transitory machine-readable medium of claim 10, wherein the operations comprise:
receiving a second URSP rule, wherein the second URSP rule is selected or generated by the PCF during the communication service; and
continuing the receiving the communication service utilizing the second URSP rule, wherein the second URSP rule is implemented without an agreement at the end user device to utilize the second URSP rule.

16. The non-transitory machine-readable medium of claim 10, wherein the first URSP rule is generated after the communication service has begun and results in a change of the QOS for the end user device during the communication service.

17. The non-transitory machine-readable medium of claim 10, wherein the first URSP rule is generated by the PCF in response to the PCF receiving the QoS information from a Network Exposure Function (NEF), and wherein the first URSP rule is based in part on a location of the end user device.

18. A method, comprising:
obtaining, by a processing system including a processor, network data associated with a communication network;
generating, by the processing system, Quality of Service (QOS) information by applying machine learning to the network data; and
providing, by the processing system, the QoS information to a Policy Control Function (PCF) that selects or generates a first UE Route Selection Policy (URSP) rule according to the QoS information and provides the first URSP to an end user device, wherein the first URSP rule is implemented to provide a communication service to the end user device utilizing an application via the communication network responsive to acceptance by the end user device of the first URSP rule, and wherein the end use device is not permitted to reject the first URSP rule if the first URSP rule increases resources of the communication network available for use by a first responder device.

19. The method of claim 18, wherein the PCF selects or generates a second URSP rule during the communication service, and wherein the second URSP rule is implemented during the communication service and results in a change of QoS for the communication service.

20. The method of claim 18, wherein the obtaining the network data is at least based in part on data that is obtained by an analytics platform operated by a first entity that is distinct from a second entity operating the communications network, and wherein the providing the QoS information to the PCF is via a Network Exposure Function (NEF).

* * * * *